Patented May 18, 1937

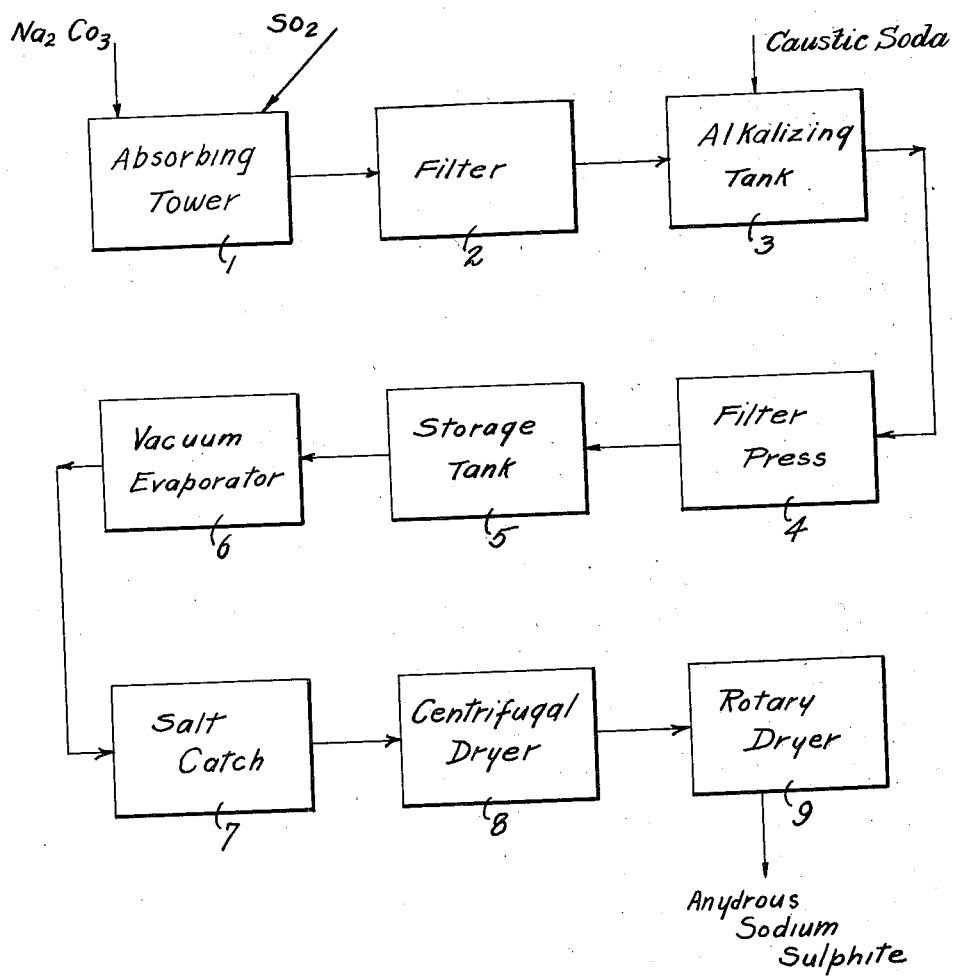

2,080,528

UNITED STATES PATENT OFFICE 2,080,528

PROCESS OF MANUFACTURING ANHYDROUS SODIUM SULPHITE

Frederic C. Bowman, Los Angeles, and Holger Stougaard, Walnut Park, Calif., assignors to A. R. Maas Chemical Co., Los Angeles, Calif., a corporation of California Application March 11, 1932, Serial No. 598,214
Renewed October 10, 1936

9 Claims. (Cl. 23—129)

This invention relates to the process of manufacturing anhydrous sodium sulphite of high purity.

Anhydrous sodium sulphite is used in relatively large quantities and is required of extremely high purity for use in the developing of photographic films and the development in the motion picture industry of sound pictures with the consequent requirement for the development of the sound track film where the most exacting developing conditions are met requiring the production in an inexpensive manner of sodium sulphite of a very high strength and purity.

Sodium sulphite has heretofore been made principally by the dehydration of sodium sulphite heptahydrate produced by the gasification with sulphur dioxide of a solution of soda ash. The heptahydrate is crystallized and then dehydrated.

It is an object of our invention to provide a process of manufacturing anhydrous sodium sulphite of high purity and strength which may be economically carried out at relatively low cost and wherein the sodium sulphite is precipitated from its solution as the anhydrous salt so that the evaporation of the water of crystallization of the heptahydrate and the crystallization of the anhydrous sodium sulphite are carried out simultaneously and as a single step.

Another object of our invention is to provide a method of manufacturing anhydrous sodium sulphite in which practically all the apparatus utilized is constructed of steel which is so protected by the solution from which the anhydrous sodium sulphite is precipitated that the solution is not contaminated and the anhydrous salt derived therefrom is not contaminated with impurities derived from the apparatus.

Another object of this invention is to produce anhydrous sodium sulphite by crystallization from a solution of sodium sulphite, which solution of sodium sulphite is purified by the addition thereto of an alkaline hydroxide and filtration to remove the hydroxide of the impurities carried in the solution.

Another object of this invention is to provide a process for manufacturing anhydrous sodium sulphite wherein the evaporation of the sulphite liquor and formation of the anhydrous sulphite takes place in the presence of sodium hydroxide.

Another object of this invention is to provide a method of manufacturing anhydrous sodium sulphite wherein the anhydrous sodium sulphite is produced by evaporation with crystallization of the sulphite in vacuo, that is, at temperatures below the atmospheric boiling point of the sulphite solution and at pressures below atmospheric pressure.

Another object of this invention is to provide a method of manufacturing anhydrous sodium sulphite wherein the crystals of anhydrous sodium sulphite derived from evaporation and crystallization of the sulphite liquor are separated from the mother liquor by centrifuging the crystals and drying the same without contamination of the crystals due to the washing thereof to avoid the production within the crystals of sodium sulphate and sodium carbonate and the introduction into the crystals of these and other impurities derived from the wash water.

Other objects and advantages of this invention it is believed will be apparent from the following detailed description of a preferred embodiment of the process embodying our invention as diagrammatically illustrated in the accompanying drawing.

We have discovered that anhydrous sodium sulphite may be produced in crystalline form of very high purity from commercial grades of soda ash or "Solvay" soda by gasifying a solution of Solvay soda with sulphur dioxide, filtering the sodium sulphite thereby produced, and then removing such impurities as iron from the solution by the use of alkaline hydroxides, filtering the hydroxides formed from the sodium sulphite solution, and then concentrating and crystallizing the solution at temperatures above the point of transition of the sodium sulphite to the anhydrous form in the presence of the alkaline hydroxide.

We have also discovered that where this process is carried out in the presence of the alkaline hydroxides, that the anhydrous crystals formed are free of the alkaline hydroxide which remains in the mother liquor.

We have also discovered that the size of the crystals formed by this direct evaporation and crystallization of the anhydrous sodium sulphite from the liquor may be controlled by controlling the alkalinity of the solution and the temperature at which the crystallization is effected so that the simultaneous evaporation and crystallization of the solution containing the sodium sulphite takes place at temperatures below the atmospheric boiling point of the saturated sodium sulphite solution. We have found that increasing the alkalinity of the solution reduces the size of the crystals, but acts to remove impurities and reduce scaling in the evaporator used and that reduced temperature operation increases crystal size. We have found that there is an optimum condition of operation in which the balance between scaling and crystal size is nicely and exactly controlled.

We have also discovered that by maintaining the solution of sodium sulphite alkaline by the use of alkaline hydroxides that we are enabled to carry out the process of simultaneous evaporation and crystallization of the anhydrous sodium sulphite in apparatus constructed of steel, iron, cast iron, or the like, without contamination of the apparatus with impurities derived by the attacking of the apparatus by the solution being evaporated and crystallized.

We have also discovered that by the simultaneous evaporation and crystallization of the solution of sodium sulphite in the presence of an alkaline hydroxide that we are enabled to carry out the process of evaporation and crystallization for a much greater length of time because of the fact that the scaling of the evaporator is reduced because of the presence of the alkaline hydroxide in the liquor being concentrated and crystallized.

In carrying out the process embodying our invention, the following is given as an illustrative example:

A 21° Baumé solution of soda ash is made preferably with softened water settled and pumped to an absorbing tower 1 where it is gassed with sulphur dioxide gas until 10 c. c. of the liquor tested with phenolphthalein requires 4 c. c. of normal alkali for neutralization. The solution is then filtered in a filter 2 to remove the precipitated silica, alumina, etc., and boiled to remove traces of carbon dioxide. Caustic soda is then added in a neutralizing tank 3 in quantities slightly more than sufficient to precipitate the iron salts and the solution is again filtered in a filter 4.

The solution is then preferably tested for alkalinity by titration with a normal acid and thymolphthalein to indicate the content of the sodium hydroxide. The solution is then conducted to a storage tank 5 from which it is fed to a vacuum evaporator 6 where the solution is evaporated at a reduced pressure where the temperature of boiling is below the atmospheric boiling point of the solution, which is 102° C. It is preferable to operate under a rather high vacuum so that the boiling point of the solution is materially reduced.

In carrying out the preferred method of operation, the evaporator is operated at about a 26" vacuum, at which pressure the boiling point of the solution of sodium sulphite is approximately 55° C. When the rate of evaporation begins to slacken, indicating incipient scaling of the tubes with crystals of sodium sulphite, the batch is dumped into a salt-catch 7 where it is blown with compressed air to produce a nearly dry product. From the salt-catch 7 the salt is transferred to a centrifuge 8 where it is centrifuged as dry as possible. The salt is then taken from the centrifuge 8 and is completely dried on a rotary drier 9 which is fed with steam-heated air.

The foregoing is given merely as an illustrative example of the manner in which the process embodying our invention is carried out to good advantage and it is not intended that our invention should be limited to the details of this illustrative example.

The alkaline hydroxide used is not only utilized for the purpose of precipitating the iron impurities from the soda ash, but is also used for the purpose of protecting the apparatus which may be entirely constructed of steel or iron when the process is carried out in the presence of the alkaline hydroxide without danger of the apparatus being attacked by the sulphite liquor.

In the absence of an alkaline hydroxide, the apparatus is attacked by the sulphite solution which does not introduce a large portion of impurities into the solution but results in the discoloring of the solution so that the salts as formed are discolored. The alkaline hydroxide as utilized in the process serves another very important function and that is, in the reduction of the scaling or sealing up of the tubes of the vacuum evaporator 6 enabling the process to be carried out without the necessity of shutting the same down at such frequent intervals to clean the tubes of the evaporator.

In carrying out our process we have found that there is an optimum concentration of alkaline hydroxide which will permit the formation of crystals large enough to permit their centrifuging and subsequent drying and which will delay the scaling up of the evaporator. The optimum hydroxide concentration of this solution we have found to be where the solution has a pH above 10.34; that is, by the addition of an alkaline hydroxide to raise the pH of the solution above 10.34 the iron will be removed from the solution even in the presence of the carbonate and will be precipitated as ferrous or ferric hydroxide, leaving the solution of sufficient alkalinity to enable the carrying out of the process in steel or iron containers and likewise to reduce the scaling of the tubes of the evaporator.

The minimum alkalinity is preferably determined by titrating 10 c.c. of the liquor with N/1 acid, using thymolphthalein as an indicator. The burette reading should be 1.25 c. c. If the reading is above 1.8 c. c., the crystals formed will be too fine and the product will be inferior in strength and purity. In all probability the use of different types of evaporators would alter, to some extent, the alkalinity limits.

In the absence of carbon dioxide, a hydroxide is not needed to remove iron salts or protect the apparatus. The alkali is necessary however to control scaling. If caustic soda is used instead of soda ash in such case an alkaline hydroxide would not be required or used except to control scaling in the evaporator.

The crystallization is carried out under the influence of reduced pressure in order to control the size of the crystals found, and to enable the formation of crystals large enough to centrifuge. It is necessary if the product formed is to be of high purity, fine crystals can not be centrifuged, the finer the crystals the more liquor carried with them and because of the greater ratio of surface area to volume, small crystals are much more subject to oxidation.

Having fully described our invention, it is to be understood that we do not wish to be limited to the details herein set forth, but our invention is of the full scope of the appended claims.

We claim:

1. The method of producing anhydrous sodium sulphite which includes the steps of forming a concentrated solution of sodium sulphite, raising the alkalinity of the solution with a hydroxide of an alkali metal and evaporating and crystallizing the sulphite in the presence of the alkaline hydroxide.

2. A method of producing anhydrous sodium sulphite from sodium carbonate containing an impurity of iron which includes dissolving the sodium carbonate in water, neutralizing the sodium carbonate with sulphur dioxide, adding sodium hydroxide to the solution to precipitate the iron as a hydroxide, filtering the solution, evaporating and crystallizing the sodium sulphite from the solution in the presence of the sodium hydroxide.

3. A method of producing anhydrous sodium sulphite which includes the steps of concentrating the solution by evaporation and crystallizing the sodium sulphite therefrom in the presence of a hydroxide of an alkali metal.

4. A method of producing anhydrous sodium sulphite which includes the steps of simultaneous evaporation and crystallization of sodium sulphite solution in the presence of a hydroxide of an alkali metal.

5. A method of producing anhydrous sodium sulphite crystals which includes the steps of crystallizing sodium sulphite from a solution thereof containing impurities including a hydroxide of an alkali metal at a temperature in excess of the temperature of transition of the sodium sulphite to the anhydrous form.

6. A method of producing anhydrous sodium sulphite from sodium carbonate containing an impurity of iron which includes dissolving the sodium carbonate in water, neutralizing the sodium carbonate with sulphur dioxide, removing residual carbon dioxide from the solution, adding sodium hydroxide to the solution to precipitate the iron as a hydroxide, filtering the solution, evaporating and crystallizing the sodium sulphite from the solution in the presence of the sodium hydroxide.

7. A method of producing anhydrous sodium sulphite of high purity from commercial grades of soda ash including the steps of preparing a solution of soda ash in water, passing sulphur dioxide gas through the solution, filtering the solution, removing the impurities such as iron by addition of a hydroxide of an alkali metal, filtering the hydroxides formed from the solution, and then concentrating and crystallizing anhydrous sodium sulphite from the solution at a temperature above the transition of sodium sulphite to the anhydrous form in the presence of the hydroxide of an alkali metal.

8. In a process of preparing anhydrous sodium sulphite of high purity from a solution, including the step of crystallizing the anhydrous sodium sulphite from solution in the presence of a hydroxide of an alkali metal at a temperature above the temperature of transition of the sodium sulphite to the anhydrous form.

9. In a process of preparing anhydrous sodium sulphites of high purity from solution, the step of crystallizing the anhydrous sodium sulphite from solution in the presence of sodium hydroxide and at a temperature above the temperature of transition of the sodium sulphite to the anhydrous form.

FREDERIC C. BOWMAN.
HOLGER STOUGAARD.